United States Patent
Hou et al.

(10) Patent No.: US 11,232,285 B2
(45) Date of Patent: Jan. 25, 2022

(54) METHOD AND APPARATUS FOR PROCESSING FACE IMAGE, ELECTRONIC DEVICE, AND STORAGE MEDIUM

(71) Applicant: BEIJING DAJIA INTERNET INFORMATION TECHNOLOGY CO., LTD., Beijing (CN)

(72) Inventors: Peihong Hou, Beijing (CN); Yang Wang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/875,598

(22) Filed: May 15, 2020

(65) Prior Publication Data
US 2020/0279098 A1 Sep. 3, 2020

(30) Foreign Application Priority Data
May 16, 2019 (CN) .......................... 201910411288.4

(51) Int. Cl.
*G06K 9/00* (2006.01)
*G06T 3/00* (2006.01)

(52) U.S. Cl.
CPC ........ *G06K 9/00281* (2013.01); *G06T 3/0012* (2013.01); *G06T 3/0093* (2013.01)

(58) Field of Classification Search
None
See application file for complete search history.

(56) References Cited

U.S. PATENT DOCUMENTS

| | | | | |
|---|---|---|---|---|
| 8,908,904 B2* | 12/2014 | Santos | ..................... | G06T 11/00 |
| | | | | 382/100 |
| 9,053,524 B2* | 6/2015 | Florea | ..................... | G06T 7/181 |
| 9,984,282 B2* | 5/2018 | Chen | .................. | G06K 9/00281 |
| 10,304,166 B2* | 5/2019 | Florea | ..................... | H04N 1/62 |
| 10,339,685 B2* | 7/2019 | Fu | .......................... | G06T 3/0093 |
| 10,726,601 B2* | 7/2020 | Fu | .......................... | G06T 3/0093 |
| 10,939,742 B2* | 3/2021 | Fu | ....................... | G06K 9/00281 |
| 2006/0284810 A1* | 12/2006 | Aratani | ..................... | H04N 5/45 |
| | | | | 345/90 |
| 2013/0329079 A1* | 12/2013 | Florea | .................. | H04N 5/2621 |
| | | | | 348/222.1 |
| 2016/0042224 A1* | 2/2016 | Liu | ........................ | G06K 9/033 |
| | | | | 382/203 |
| 2017/0169285 A1* | 6/2017 | Chen | .................. | G06K 9/00268 |
| 2019/0272659 A1* | 9/2019 | Fu | .......................... | G06T 3/0093 |

* cited by examiner

*Primary Examiner* — Anand P Bhatnagar
(74) *Attorney, Agent, or Firm* — Meunier Carlin & Curfman LLC

(57) ABSTRACT

A method for processing a face image. The method includes: detecting face key points in the face image; determining a face key point grid of the face image based on the face key points, wherein the face key point grid comprises a plurality of grid areas defined by connection lines between the face key points; generating a special effect face image by adding a special-effect material to a grid area in the face key point grid, wherein the special-effect material is pre-designed for representing a specified image effect; determining a processed face image by adjusting a face contour in the special effect face image based on preset liquify filter parameters, wherein the preset liquify filter parameters are determined based on the specified image effect; the processed face image has the specified image effect.

14 Claims, 5 Drawing Sheets

METHOD AND APPARATUS FOR PROCESSING FACE IMAGE, ELECTRONIC DEVICE, AND STORAGE MEDIUM

CROSS REFERENCE TO RELATED APPLICATIONS

This application claims priority to and benefit of Chinese Patent Application No. 201910411288.4, filed on May 16, 2019, which is hereby incorporated by reference in its entirety.

FIELD

The disclosure relates to the field of image processing technologies, and in particular, to a method and apparatus for processing face image, an electronic device, and a storage medium.

BACKGROUND

In the practical application of an image processing technology, it is often necessary to process a face image, so as to obtain a face image having an expected effect. For example, aging processing, rejuvenation processing, or the like is performed on the face image.

In a related technology, a special-effect material having an expected effect can be predesigned, and a face image having the expected effect can be obtained by directly adding the special-effect material to a proper position of a face image. For example, during aging processing, special-effect materials such as a wrinkle material and a spot material can be predesigned. These special-effect materials may be understood as layers having some specified special effects. Adding these special-effect materials to proper positions of a face image may be understood as covering these proper positions of the face image with these layers, thereby obtaining the face image with the expected effect.

SUMMARY

According to a first aspect of the embodiments of the disclosure, a method for processing a face image is provided, including:

detecting face key points in the face image;

determining a face key point grid of the face image based on the face key points, wherein the face key point grid comprises a plurality of grid areas defined by connection lines between the face key points;

generating a special effect face image by adding a special-effect material to a grid area in the face key point grid, wherein the special-effect material is pre-designed for representing a specified image effect;

determining a processed face image by adjusting a face contour in the special effect face image based on preset liquify filter parameters, wherein the preset liquify filter parameters are determined based on the specified image effect; the processed face image has the specified image effect.

According to a second aspect of the embodiments of the disclosure, an electronic device is provided, including:

a processor; and a memory, configured to store an instruction that can be executed by the processor, wherein the processor is configured to execute the instruction to implement the method according to a foregoing embodiment.

According to a third aspect of the embodiments of the disclosure, a nonvolatile computer storage medium is provided. In response to a computer instruction in the storage medium is executed by a processor in an electronic face image processing device, the electronic face image processing device performs the foregoing method.

According to a fourth aspect of the embodiments of the disclosure. An executable program product, including executable program codes, wherein the executable program codes are configured to be executed to perform the foregoing method.

BRIEF DESCRIPTION OF THE DRAWINGS

The accompanying drawings herein are incorporated into this specification and form part of this specification, showing embodiments conforming to the disclosure, and are used together with this specification to explain the principles of the disclosure but do not constitute an improper limitation to the disclosure.

DETAILED DESCRIPTION OF THE EMBODIMENTS

To make a person of ordinary skill in the art understand the technical solutions in the disclosure better, the technical solutions in the embodiments of the disclosure will be clearly and completely described below in conjunction with the accompanying drawings.

It should be noted that, in the specification, claims, and accompanying drawings of the disclosure, the terms "first", "second", "third", and the like are intended to distinguish between similar objects but do not necessarily indicate a specific order or sequence. It should be understood that the data termed in such a way is interchangeable in proper circumstances so that the embodiments of the disclosure described herein can be implemented in an order other than the order illustrated or described herein. Implementations described in the following exemplary embodiments do not represent all embodiments consistent with the disclosure. Conversely, they are only examples of apparatuses and methods that are consistent with some aspects of the disclosure as detailed in the appended claims.

Figure 1:
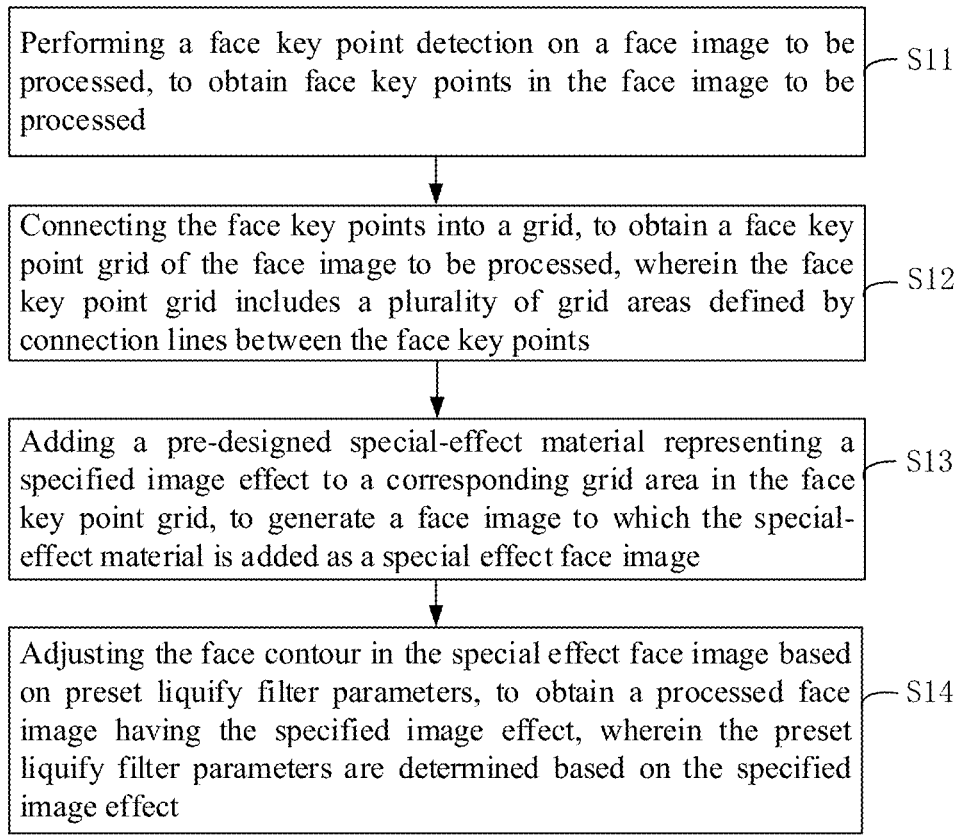
FIG. 1 is a flowchart of a face image processing method according to an exemplary embodiment.

FIG. 1 is a flowchart of a method for processing a face image in some embodiments. As shown in FIG. 1, the method includes the following steps.

Step S11: Performing a face key point detection on a face image to be processed, to obtain face key points in the face image to be processed.

Step S12: Connecting the face key points into a grid, to obtain a face key point grid of the face image to be processed, wherein the face key point grid includes a plurality of grid areas defined by connection lines between the face key points.

Step S13: Adding a pre-designed special-effect material representing a specified image effect to a corresponding grid area in the face key point grid, to generate a face image to which the special-effect material is added as a special effect face image.

Step S14: Adjusting the face contour in the special effect face image based on preset liquify filter parameters, to obtain a processed face image having the specified image effect, wherein the preset liquify filter parameters are determined based on the specified image effect.

Embodiments of the disclosure provide a method for processing a face image. In some embodiments, the face contour in the face image to which the special-effect material is added is adjusted based on the preset liquify filter parameters, to obtain the processed face image having the specified image effect. Because the preset liquify filter parameters are determined based on the specified image effect, the facial contour in the face image is adjusted to be more natural and closer to the foregoing specified image effect.

Methods and apparatuses provided in the present disclosure are described in detail by using specific embodiments in conjunction with accompanying drawings.

Figure 2A:
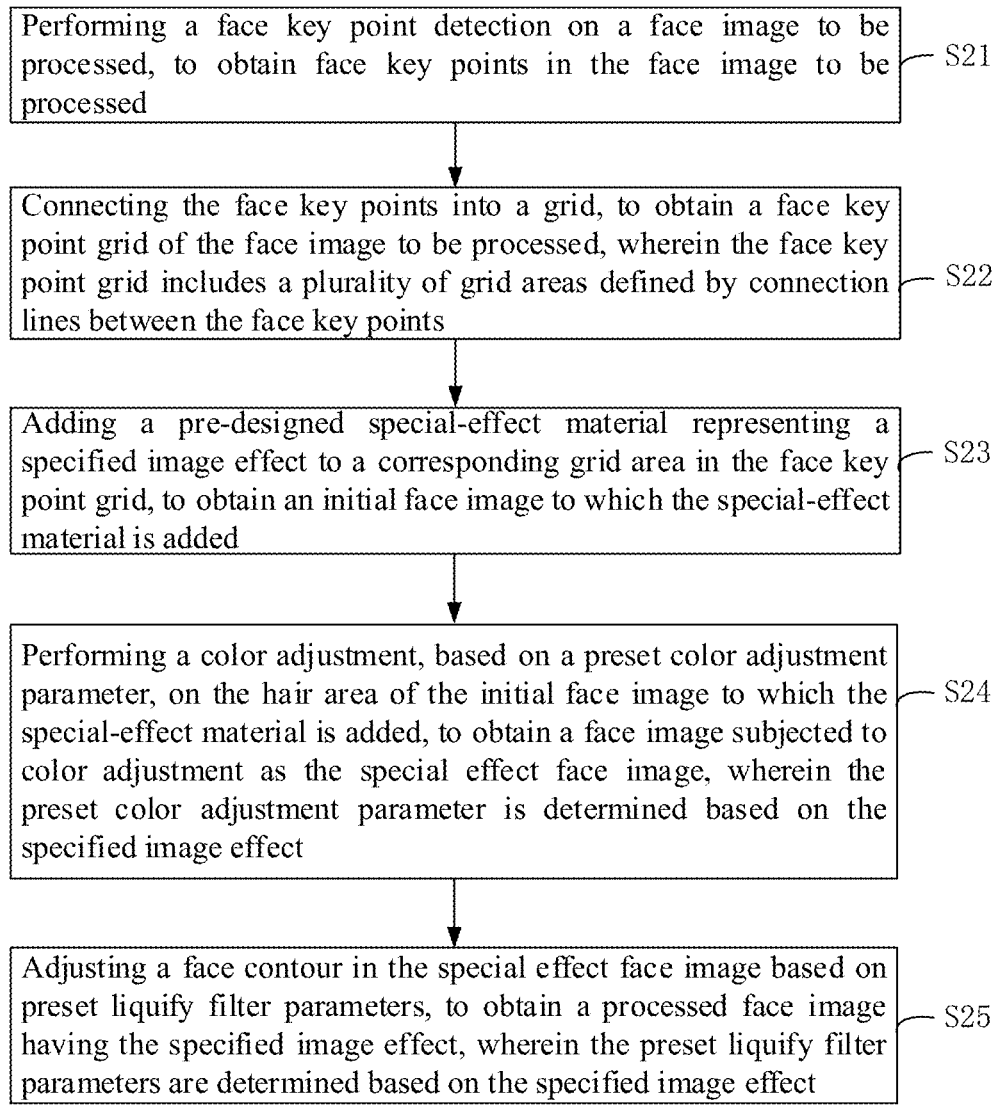
FIG. 2A is another flowchart of a method for processing a face image according to an exemplary embodiment.

FIG. 2A is another flowchart of a method for processing a face image in some embodiments. As shown in FIG. 2A, the method includes the following steps.

Step S21: Performing a face key point detection on a face image to be processed, to obtain face key points in the face image to be processed.

Figure 2B:
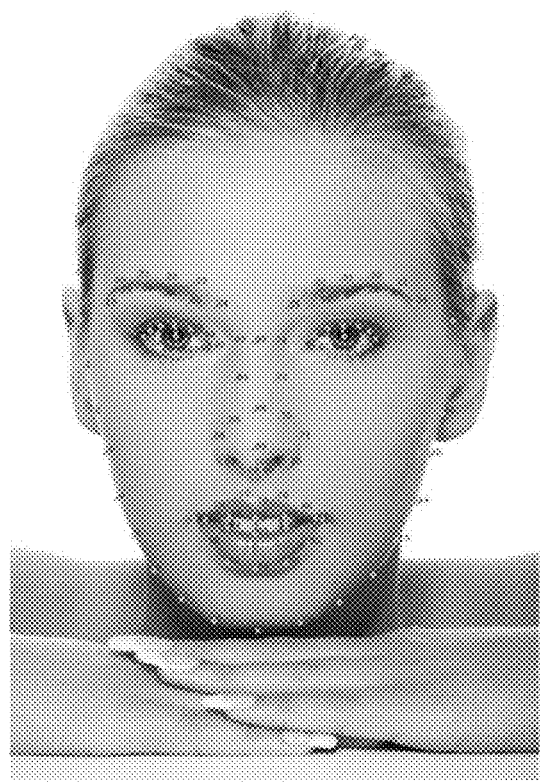
FIG. 2B is a schematic diagram of a face key point according to an exemplary embodiment.

The face key points may be key points distributed in positions such as eyebrows, eyes, a nose, a mouth, and a face contour. As shown in FIG. 2B, points in this figure represent the face key points. Key area positions of a human face can be located by performing face key point detection on a face image to be processed.

In some embodiments, face key point detection may be performed on the face image to be processed based on preset standard key points in a standard face image. For example, if there are 101 preset standard key points, a standard face image can be selected, and 101 preset standard key points in the standard face image can be extracted using a face detection algorithm, wherein the position of a face key area where each preset standard key point is located is already known. Then, 101-key-point detection can be performed on corresponding positions of the face image to be processed based on the 101 preset standard key points and the position of a face key area where each preset standard key point is located, so as to obtain standard face key points in the face image to be processed as the face key points in the face image to be processed. It should be understood that, in this case, the foregoing preset standard key points are in one-to-one correspondence to the face key points in the face image to be processed.

Alternatively, in some embodiments, the standard face key points in the face image to be processed may be obtained by performing face key point detection on the face image to be processed based on preset standard key points in a standard face image; and extended face key points are obtained by performing geometric spatial interpolation calculation based on the obtained standard face key points. For example, an extended face key point of a neck may be obtained by calculation based on an extension line of a key point of the tip of a nose and a key point of a chin. A to-be-added face key point may be further obtained by calculation based on an extended face key point obtained by calculation. Therefore, the face key point obtaining manner is not limited to calculation based on the foregoing standard face key points.

The foregoing extended key points may be added in areas with large motion amplitude, such as eyes and corners of a mouth. When the eyes and corners of the mouth move, changes of the facial contour can be more accurately captured because more face key points are added.

Step S22: Connecting the face key points into a grid, to obtain a face key point grid of the face image to be processed, wherein the face key point grid includes a plurality of grid areas defined by connection lines between the face key points.

Figure 2C:
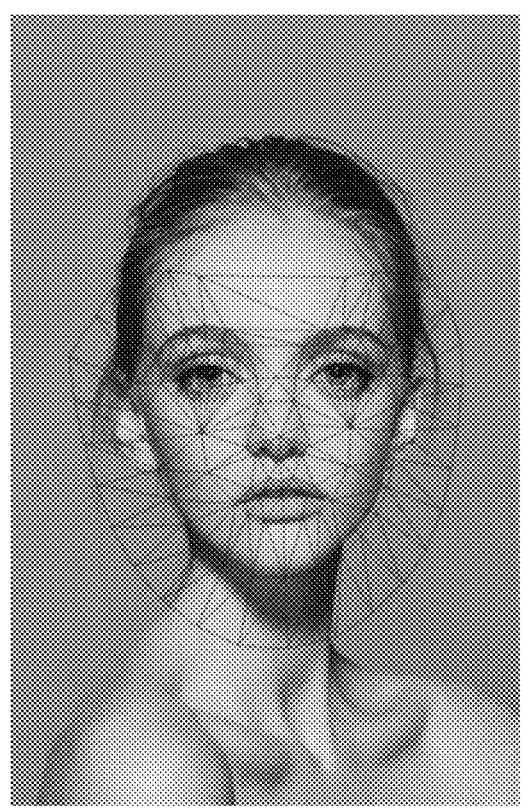
FIG. 2C is a schematic diagram of a face key point grid according to an exemplary embodiment.

As shown in FIG. 2C, each of the plurality of grid areas defined by connection lines between the face key points may be triangular, that is, each grid area may be a triangular grid area defined by connection lines between three face key points, and a plurality of triangular grid areas constitute the face key point grid of the face image to be processed. For a specific connection manner of the grid, refer to a method in the prior art. This solution imposes no limitation to this. Obviously, the foregoing grid area may be triangular.

In some embodiments, the foregoing face key point grid may be a two-dimension (2D) grid.

In this step, connecting the face key points into a grid may be understood as extracting a face image layer including the face key points from the face image to be processed.

Step S23: Add a pre-designed special-effect material representing a specified image effect to a corresponding grid area in the face key point grid, to obtain an initial face image to which the special-effect material is added.

The pre-designed special-effect material representing the specified image effect may be a special-effect material made based on a standard face image. For example, when the specified image effect is a face aging effect, a designer may draw senile materials such as a wrinkle material and a spot material on the standard face image.

In some embodiments, preset standard key points in an obtained standard face image may be connected into triangles, so as to form a 2d grid, constituted by a plurality of triangles, of the standard face image. Because the preset standard key points are in one-to-one correspondence to the face key points in the face image to be processed, the triangles defined by the preset standard key points are also in one-to-one correspondence to the triangles defined by the face key points in the face image to be processed. A standard face image grid area pattern on which the senile material is drawn can be added to a corresponding grid area of the face image to be processed based on correspondences between the triangles, so as to obtain an initial face image to which the special-effect material is added.

In this step, the pre-designed special-effect material representing the specified image effect may be understood as a special-effect material layer. Adding the special-effect material to the corresponding grid area in the face key point grid may be understood as adding the special-effect material layer to the foregoing face image layer, that is, the two layers are combined to obtain an initial face image to which the special-effect material is added.

In the foregoing step, if connected 2d grids are uniform, a change of each key point may be tracked more easily. Each triangle may be connected fully enough, so that when the mesh is deformed, adjacent side crossing can be prevented, which further makes the special-effect material added in the face image more stable.

Step S24: Performing a color adjustment, based on a preset color adjustment parameter, on the hair area of the initial face image to which the special-effect material is added, to obtain a face image subjected to color adjustment as the special effect face image, wherein the preset color adjustment parameter is determined based on the specified image effect.

Figure 2D:
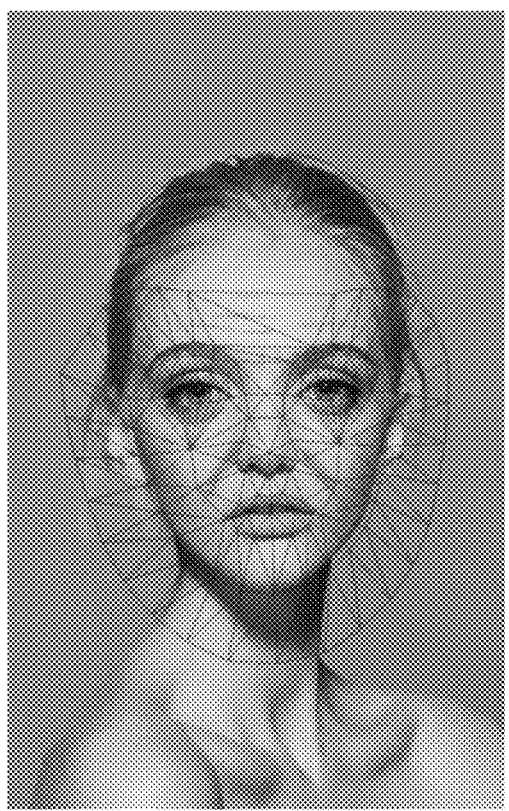
FIG. 2D is a face image with a color matched hair area according to an exemplary embodiment.

The preset color adjustment parameter may also be determined based on a standard face image. Similarly, when the foregoing specified image effect is a face aging effect, a selected color adjustment parameter may be determined based on the aging effect. The hair area of the standard face image that is obtained in step S23 and on which the aging material is drawn can be extracted and adjusted to hoary by using a color searching table, to obtain the face image subjected to color adjustment that is shown in FIG. 2D and that is used as the special effect face image. Obviously, the color adjustment parameter corresponding to hoary is the preset color adjustment parameter.

After the hair area is adjusted to hoary in the foregoing step, the face aging effect is more vivid and real.

Step S25: Adjusting the face contour in the special effect face image based on preset liquify filter parameters, to obtain a processed face image having the specified image effect, wherein the preset "liquify filter" parameters are determined based on the specified image effect.

Figure 2E:
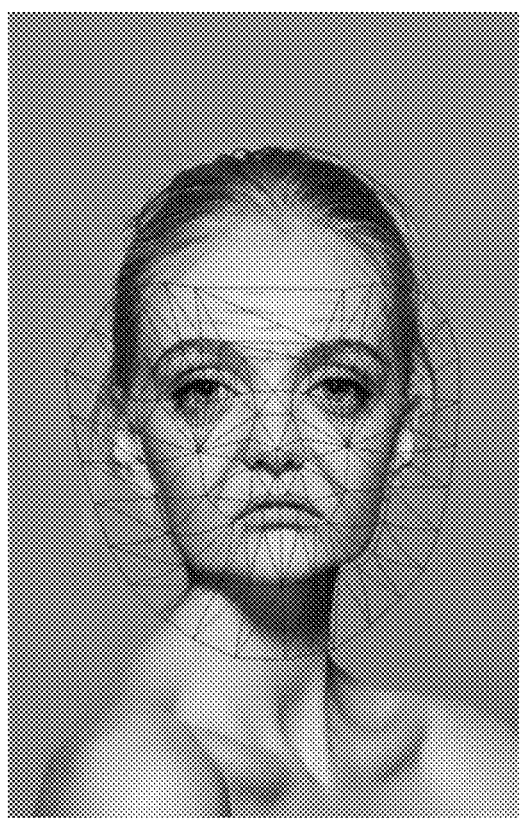
FIG. 2E is a face image with an adjusted face contour according to an exemplary embodiment.

The foregoing preset liquify filter parameters may also be preset based on the standard face image. In some embodiments, a plurality of groups of known liquify filter parameters may be selected to adjust the face contour in the standard face image respectively, to obtain a plurality of liquified face images; a liquified face image conforming to the specified image effect best is selected from the plurality of liquified face images; and a group of liquify filter parameters corresponding to the selected liquified face image is determined as the preset liquify filter parameters used for face image processing. For example, when the specified image effect is a face aging effect, a plurality of groups of liquify filter parameters may be selected for adjusting the face contour in the special effect face image, so as to obtain the effect shown in FIG. 2E; and liquify filter parameters with the best face aging effect are determined as the preset liquify filter parameters. Each of the plurality of groups of liquify filter parameters may include a liquifying start point, a liquifying direction and a liquifying radius.

In this embodiment, preset parameters and layers such as the preset liquify filter parameters and the pre-designed special-effect material representing the specified image effect may be stored in a server. When the face image to be processed needs to be processed for the specified image effect, a preset parameter and layer may be downloaded from the server, and then the face image to be processed is processed with the preset parameter and layer.

Figure 3:
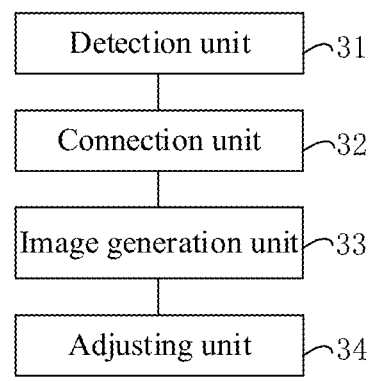
FIG. 3 is a block diagram of a apparatus for processing a face image according to an exemplary embodiment.

FIG. 3 is a block diagram of an apparatus for processing a face image in some embodiments. Referring to FIG. 3, the apparatus includes followings.

A detection unit 31 configured to perform a face key point detection on a face image to be processed, to obtain face key points in the face image to be processed.

A connection unit 32 configured to connect the face key points into a grid, to obtain a face key point grid of the face image to be processed, wherein the face key point grid includes a plurality of grid areas defined by connection lines between the face key points.

An image generation unit 33 configured to add a pre-designed special-effect material representing a specified image effect to a corresponding grid area in the face key point grid, to generate a face image to which the special-effect material is added as a special effect face image.

An adjusting unit 34 configured to adjust the face contour in the special effect face image based on preset liquify filter parameters, to obtain a processed face image having the specified image effect, wherein the preset liquify filter parameters are determined based on the specified image effect.

In some embodiments, the detection unit 31 is configured to: perform a face key point detection on a face image to be processed based on preset standard key points in a standard face image, to obtain standard face key points in the face image to be processed as the face key points in the face image to be processed; or, perform a face key point detection on a face image to be processed based on preset standard key points in a standard face image, to obtain standard face key points in the face image to be processed, and perform geometric spatial interpolation calculation based on the obtained standard face key points, to obtain extended face key points, wherein both the standard face key points and the extended face key points are used as the face key points in the face image to be processed.

In some embodiments, the adjusting unit 34 is further configured to determine the preset liquify filter parameters in the following manner. Adjusting the face contour in a standard face image based on a plurality of groups of known liquify filter parameters respectively, to obtain a plurality of liquified face images; selecting a liquified face image conforming to the specified image effect best from the plurality of liquified face images; and determining a group of liquify filter parameters corresponding to the selected liquified face image as the preset liquify filter parameters used for face image processing.

In some embodiments, each of the plurality of groups of liquify filter parameters includes a liquifying start point, a liquifying direction and a liquifying radius.

In some embodiments, the image generation unit 33 is configured to: add a pre-designed special-effect material representing a specified image effect to the corresponding grid area in the face key point grid, to obtain an initial face image to which the special-effect material is added; and perform color adjustment, based on a preset color adjustment parameter, on the hair area of the initial face image to which the special-effect material is added, to obtain a face image subjected to color adjustment as the special effect face image, wherein the preset color adjustment parameter is determined based on the specified image effect.

In some embodiments, the face key point grid is a two-dimension (2D) grid.

Specific implementations of operations performed by the modules of the apparatus in the foregoing embodiment have been described in detail in related method embodiments. Details are not described herein again.

Figure 4:
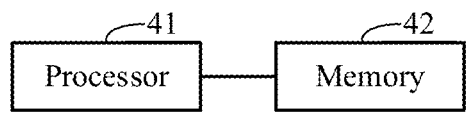
FIG. 4 is a schematic block diagram of an electronic device according to an exemplary embodiment.

FIG. 4 is a schematic block diagram of an electronic device in some embodiments.

The electronic device may include: a processor 41 and a memory 42 configured to store an instruction that can be executed by the processor.

The processor 41 is configured to execute the foregoing instruction, to implement any one of the foregoing methods for processing a face image.

The foregoing processor 41 may be a general-purpose processor including a central processing unit (CPU), a network processor (NP) and the like, or may be a digital signal processor (DSP), an application-specific integrated circuit (ASIC), a field programmable gate array (FPGA), or another programmable logic device, a discrete gate or a transistor logic device, a discrete hardware component, or the like.

In some embodiments, a storage medium is further provided. The storage medium stores a computer program. When the computer program is executed by a processor, any one of the face image processing methods in the foregoing embodiments is implemented. In some embodiments, the foregoing storage medium may be a non-temporary computer readable storage medium. For example, the foregoing non-provisional computer readable storage medium may be an ROM, a random access memory (RAM), a CD-ROM, a magnetic tape, a floppy disk, an optical data storage device, and the like.

In some embodiments, a computer program product including an instruction is further provided. When the computer program product runs on a computer, the computer executes any one of the methods for processing a face image in the foregoing embodiments.

All or some of the foregoing embodiments may be implemented by means of software, hardware, firmware, or any combination thereof. When software is used to implement the embodiments, the embodiments may be implemented wholly or partially in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a special-purpose computer, a computer network, or another programmable apparatus. The computer instructions may be stored in a computer readable storage medium or may be transmitted from one computer readable storage medium to another computer readable storage medium. For example, the computer instructions may be transmitted from one web site, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

After considering this specification and implementing the present disclosure disclosed herein, a person skilled in the art will easily figure out other embodiments of the disclosure. This application is intended to cover any variation, usage or adaptive change of the disclosure. These variations, usages and adaptive changes conform to the general principle of the disclosure and include common knowledge or customary technical means in the art that are not disclosed in the disclosure. The specification and embodiments are merely examples. The real scope and spirit of the disclosure are indicated by the claims below.

It should be understood that, the disclosure is not limited to the precise structures that are described above and shown in the accompanying drawings. Various modifications and changes may be made without departing from the scope of the disclosure. The scope of the disclosure is limited by only the appended claims.

The invention claimed is:

1. A method for processing a face image, comprising:
   detecting face key points in the face image;
   determining a face key point grid of the face image based on the face key points, wherein the face key point grid comprises a plurality of grid areas defined by connection lines between the face key points;
   generating a special effect face image by adding a special-effect material to a grid area in the face key point grid, wherein the special-effect material is pre-designed for representing a specified image effect;
   determining a processed face image by adjusting a face contour in the special effect face image based on preset liquify filter parameters, wherein the preset liquify filter parameters are determined based on the specified image effect; the processed face image has the specified image effect.

2. The method for processing a face image according to claim 1, wherein said detecting face key points further comprises:
   determining standard face key points as the face key points, wherein the standard face key points is detected in the face image based on preset standard key points in a standard face image;
   or
   determining extended face key points as the face key points, wherein the extended face key points is determined by performing a geometric spatial interpolation calculation based on the standard face key point.

3. The method for processing a face image according to claim 1, wherein the preset liquify filter parameters are determined by:
   determining a plurality of liquified face images by adjusting a face contour in the standard face image based on a plurality of groups of known liquify filter parameters;
   selecting a liquified face image from the plurality of liquified face images, wherein selected liquified face image matches the specified image effect best; and
   determining a group of liquify filter parameters as the preset liquify filter parameters, wherein the group of liquify filter parameters correspond to selected liquified face image.

4. The method for processing a face image according to claim 3, wherein the liquify filter parameters comprises: a liquifying start point, a liquifying direction and a liquifying radius.

5. The method for processing a face image according to claim 1, wherein said generating a special effect face image comprises:
   determining an initial face image by adding a pre-designed special-effect material to the grid area in the face key point grid, wherein the pre-designed special-effect material represents a specified image effect; and
   determining the special effect face image by performing a color adjustment on hair area of the initial face image based on a preset color adjustment parameter, wherein the preset color adjustment parameter is determined based on the specified image effect.

6. The method for processing a face image according to claim 1, wherein the face key point grid comprises a two-dimension grid.

7. An electronic device, comprising:
   a processor; and
   a memory configured to store a computer instruction, wherein
   the processor is configured to execute the computer instruction to implement the method for processing a face image according to claim 1.

8. The electronic device according to claim 7, wherein the processor is configured to execute the computer instruction to detect the face key points by:

determining standard face key points as the face key points, wherein the standard face key points is detected in the face image based on preset standard key points in a standard face image;
or
determining extended face key points as the face key points, wherein the extended face key points is determined by performing a geometric spatial interpolation calculation based on the standard face key point.

9. The electronic device according to claim 7, wherein the processor is configured to execute the computer instruction to determine the preset liquify filter parameters by:
determining a plurality of liquified face images by adjusting a face contour in the standard face image based on a plurality of groups of known liquify filter parameters;
selecting a liquified face image from the plurality of liquified face images; wherein selected liquified face image matches the specified image effect best, and
determining a group of liquify filter parameters as the preset liquify filter parameters, wherein the group of liquify filter parameters correspond to selected liquified face image.

10. The electronic device according to claim 9, wherein the liquify filter parameters comprises: a liquifying start point, a liquifying direction and a liquifying radius.

11. The electronic device according to claim 7, wherein the processor is configured to execute the computer instruction to generate the special effect face image by:

determining an initial face image by adding a pre-designed special-effect material to the grid area in the face key point grid, wherein the pre-designed special-effect material represents a specified image effect; and
determining the special effect face image by performing a color adjustment on hair area of the initial face image based on a preset color adjustment parameter, wherein the preset color adjustment parameter is determined based on the specified image effect,
wherein the preset color adjustment parameter is determined based on the specified image effect.

12. The electronic device according to claim 7, wherein the face key point grid comprises a two-dimension grid.

13. A nonvolatile computer storage medium, wherein in response to a computer instruction in the nonvolatile computer storage medium is executed by a processor in an electronic face image processing device, the electronic face image processing device performs the method for processing a face image according to claim 1.

14. An executable program product, comprising a non-transitory computer readable medium encoded with an information processing program for use in an information processing device, wherein the information processing program when executed performs the method for processing a face image according to claim 1.

* * * * *